(12) United States Patent
Allaire et al.

(10) Patent No.: US 6,267,876 B1
(45) Date of Patent: Jul. 31, 2001

(54) CONTROL OF MAGNETIC BEARING-SUPPORTED ROTORS

(75) Inventors: Paul E. Allaire, Charlottesville, VA (US); Robert O. Bartlett, Frederick, MD (US); Panagoitis Tsiotras, Atlanta, GA (US)

(73) Assignee: Trinity Flywheel Power, Livermore, CA (US)

( * ) Notice: Subject to any disclaimer, the term of this patent is extended or adjusted under 35 U.S.C. 154(b) by 0 days.

(21) Appl. No.: 09/363,330

(22) Filed: Jul. 28, 1999

Related U.S. Application Data

(60) Provisional application No. 60/094,924, filed on Jul. 31, 1998.

(51) Int. Cl.⁷ .......................................... H02K 7/09
(52) U.S. Cl. .................. 210/90.5; 310/68 B; 218/34; 218/114
(58) Field of Search .................. 310/90.15, 68 B; 318/34–38, 114–134

(56) References Cited

U.S. PATENT DOCUMENTS

| | | | |
|---|---|---|---|
| 5,084,643 | * 1/1992 | Chen | 310/90.5 |
| 5,347,190 | * 9/1994 | Lewis et al. | 310/90.5 |
| 5,732,636 | * 3/1998 | Wang et al. | 104/248 |
| 5,736,800 | * 4/1998 | Iannello et al. | 310/90.5 |
| 5,767,597 | * 6/1998 | Gondhalekar | 310/90.5 |
| 6,005,315 | * 12/1999 | Chapman | 310/90.5 |

* cited by examiner

Primary Examiner—Nestor Ramirez
Assistant Examiner—Thanh Lam
(74) Attorney, Agent, or Firm—Woodcock Washburn Kurtz Mackiewcz & Norris LLP

(57) ABSTRACT

Rotor systems are provided comprising rotor, magnetic bearings and a magnetic bearing controller. The controller is one which varies in accordance with linear parameters and is preferably responsive to linear matrix inequalities. High speed, low loss flywheel systems, especially electromagnetic flywheel batteries are facilitated through such rotor systems.

4 Claims, 4 Drawing Sheets

Basic Magnetic Suspension Scheme

CONTROL OF MAGNETIC BEARING-SUPPORTED ROTORS

This appln claims the benefit of Provisional No. 60/094,924 filed Jul. 31, 1998.

FIELD OF THE INVENTION

This invention relates to methods of controlling the performance of magnetic bearing-supported rotors especially these which are designed to change speeds during operation. High speed rotors are supported by magnetic bearings which require an electronic control system. The control systems of this invention can be used to control rotor displacements and magnetic bearing currents inter alia, at low values. The methods of controlling the magnetic bearing systems of this invention employ mathematical relationships deriving from the rotor-magnetic bearing system. When a rotor operates over a speed range, parameters in the rotor change with time due to such effects as gyroscopics. The rotor-magnetic bearing systems of the invention employ advanced mathematical modeling and controller development to enable the physical hardware to operate in the most desirable manner with low vibration levels and low operating magnetic bearing currents. This invention concerns methods of using a linear parameter varying control system. The present invention also allows the user to implement a small to moderate size control system on a personal computer or workstation size computer for the operation of a high speed rotor-magnetic bearing system over an operating speed range.

BACKGROUND OF THE INVENTION

Historically, high speed rotors supported in magnetic bearings have been employed in applications such as energy storage flywheels, momentum transfer flywheels, pointing devices, and control moment gyroscopes. Typically, rotors in devices such as these are constructed of a relatively massive wheel with high inertia, such as a disk or cylinder, which is attached to a support shaft. The support shaft is driven by a motor, or motor-generator in the case of energy storage flywheels, and is supported by magnetic bearings. In normal operation, the rotor mass has different spin speeds which produces the energy storage, momentum transfer, pointing and control moment functions. Such high speed, magnetically suspended rotor systems are known per se. For example, see U.S. Ser. No. 09/248,520 filed Feb. 2, 1999, incorporated herein by reference.

Thus, this invention provides novel rotor-magnetic bearing control, especially linear parameter varying control systems for high speed rotors. An exemplary application comprising a large inertia energy storage/momentum mechanical flywheel rotor, a motor/generator, a set of magnetic bearings to support the flywheel rotor, a support shaft attached to the flywheel rotor, power amplifiers. It is therefore a primary objective of this invention is to provide improvements in the operation of high speed rotor-magnetic bearing systems using the linear parameter varying control system. The linear parameter varying control method optimizes rotor operation over the entire speed range of the flywheel plant supported on magnetic bearings. The advantages of the invention include the reduction of rotor vibration over the operating speed range of the rotor compared with previous control methods and minimization of coil currents to minimize rotating power losses in the flywheel rotor operational range.

SUMMARY OF THE INVENTION

The present invention provides innovative methods of controlling magnetic bearings, which permits optimum control. Linear parameter varying control methods optimize rotor operation over the entire speed range of the flywheel plant supported on magnetic bearings. Advantages of the invention include the reduction of rotor vibration over the operating speed range of the rotor compared with previous control methods and minimization of coil currents to minimize rotating power losses in the flywheel rotor operational range.

Conventional automatic control systems applied to magnetic bearing in previous applications assume that the plant is invariant with time. This means that the control algorithm is formulated based upon the engineering model of the rotor, bearing, actuator, sensor, and other components of the flywheel system, called the plant, that is time independent. Some of the control algorithms typically employed for time independent control algorithms are proportional-integral-derivative (PID) controls, mu synthesis and $H_\infty$ controls. The control algorithm is then designed to operate for the specific values of the plant which are evaluated for a particular speed.

A number of high speed rotor applications such as high inertia flywheel rotors inherently have large gyroscopic effects. For example, in energy storage flywheel rotors, the energy stored in the flywheel is proportional to the mass of the flywheel, the square of the rotational speed, and the square of the radius of the mass. This means that the most effective energy storage will have most of the mass at the outer edges of the flywheel. In turn, this means that gyroscopic effects are very significant in energy storage/momentum wheels. Gyroscopic forces in energy storage/flywheel rotors (or any rotating mechanical component) are proportional to the operating speed of the rotor. These forces couple the vibration of the rotor along two transverse axes, often denoted x and y, which makes these forces difficult to control with the magnetic bearing control algorithm and maintain a centered rotor operation.

Other rotor properties will also vary with rotor operational speed. The rotor geometry changes due to centrifugal stress and thermal expansion. As the speed increases, centrifugal stresses induce strains in the rotor material generating significant increases in the rotor diameter and other dimensions. As the rotor speed increases, heat generation will increase and the rotor will run at higher temperatures. Thermal expansion of the rotor material creates additional changes in rotor geometry.

An energy storage/momentum flywheel must have the capability to accelerate and decelerate at a certain rate in order to have to capability to attain the desired energy storage or production and/or the desired changes in momentum. As the flywheel rotor accelerates or decelerates, the rotor properties change compared to conventional constant speed rotor models.

Figure 1:
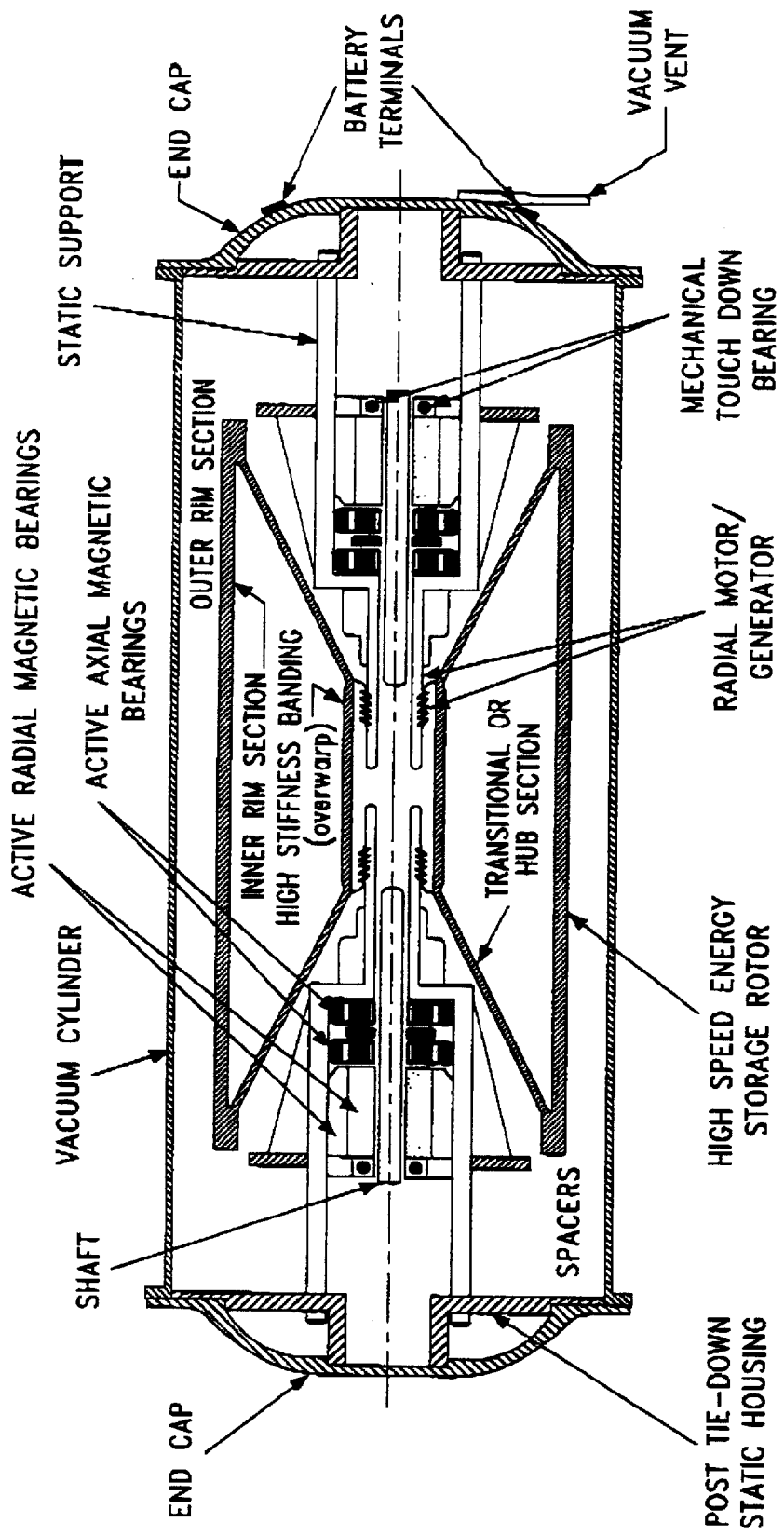
FIG. 1 depicts an exemplary high speed magnetic bearing-supported rotor useful, e.g. in an energy storage flywheel.

An exemplary high speed rotor, such as used in an energy storage flywheel, is shown in FIG. 1. The components are listed as rotor, motor/generator, shaft, magnetic bearings, static support and vacuum housing. The example shown in FIG. 1 is an energy storage wheel in cylindrical form which can rotate at high speeds. At low rotational speeds, the energy storage is low while at high rotational speeds, the energy storage is very high. The energy is transformed by the attached motor/generator. In order to perform the desired function of energy input, the rotor speed is made to increase by the motor/generator's acting as a motor such that electrical energy input is converted to the mechanical energy of rotation. In order to obtain energy output in the form of electrical power, the motor/generator is used as a generator and the mechanical energy is extracted from the rotor, slowing it down.

The rotor is attached to the rotating shaft by the diagonal struts, as shown in FIG. 1, other geometric configuration, or electromagnetically. The shaft is supported in two radial magnetic bearings, typically one at each end, and a thrust bearing (not shown). The shaft has magnetic rotor components attached to it facing the non-rotating stator components of the magnetic bearings. The stator of the magnetic bearings is supported on a static support, as shown in FIG. 1. A non-rotating vacuum housing completes the typical flywheel configuration as shown in FIG. 1.

Figure 2:
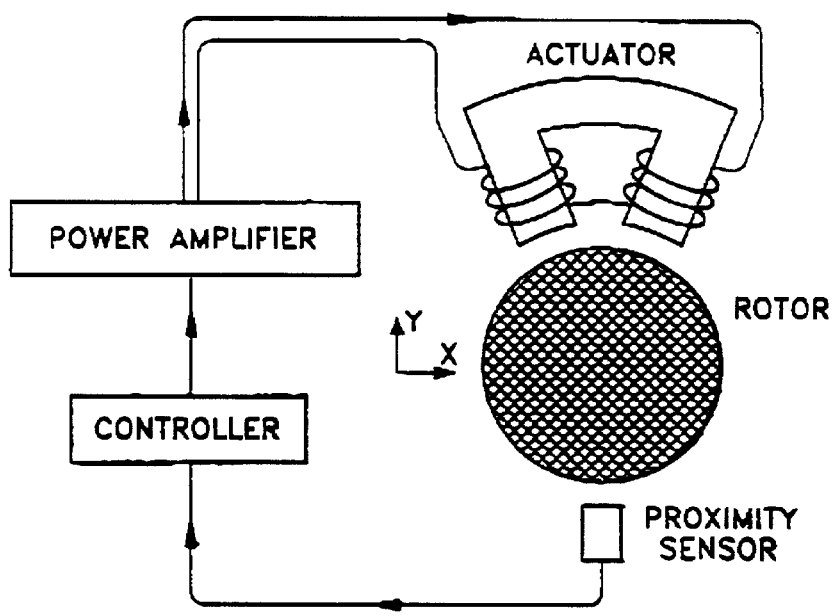
FIG. 2 shows certain magnetic bearing components.

A magnetic bearing, shown schematically in FIG. 2, consists of four primary components: a magnetic actuator composed of an assembly of coil wound magnetic poles attached to a ring facing the shaft, an electronic control system which determines the control currents in the coils, a set of power amplifiers which produce the control currents as commanded by the control system, and a set of sensors which determine the shaft position in the bearing. The magnetic bearing has an automatic control system, implemented electronically, to adjust the magnetic bearing coil currents to control shaft vibrations due to external forces acting on the shaft.

Some rotors, such as in certain energy storage/momentum flywheels, employ ball bearings which have a limited, finite life. Magnetic bearings have non-contact operation with the rotating shaft of the rotor supported in a magnetic field rather than a mechanical support such as resting on the inner race of a ball bearing. This results in very long life compared to ball bearings. Ball bearings have limited physical life due in part, to Hertzian contact stresses. The primary failure point in magnetic bearings on the other hand, is the power amplifiers or control circuits. In case of failure, these electronic components can relatively easily be replaced (in ground applications or in manned space applications) or made fault tolerant, and bearing life can easily be extended by techniques for automatic time sharing of remaining circuits using fault tolerant algorithms.

Magnetic bearings also do not require any lubricant, which is particularly useful in vacuum operations such as required for successful operation of a high speed energy storage/momentum flywheel or other applications. There are a number of potential applications which can benefit from this bearing arrangement: space applications, including satellite energy storage and/or momentum wheels; ground based uninterruptable power supplies, such as for critical computer power supplies; vehicular electric power, including automotive, bus, military vehicles, and trucks, and many others. Unlike magnetic bearings, ball bearings employed in high speed rotors such as energy storage/momentum space applications require either some self contained lubricant supply or may operate in dry contact. The low temperature normally found in space applications severely limits possible lubricants or lubricant supply systems. Fixed ground based applications of high speed rotors such as energy storage/momentum flywheels will generate very high operational temperatures, well above the normal operating temperature range of conventional lubricants which severely limits possible lubricants in this case. Dry contact lubrication ball bearing operation has very limited expected life even at moderate speeds illustrating the advantage of magnetic bearings for these applications.

Magnetic bearings have relatively low power loss, compared to ball bearings, when operated at high speeds. In many applications such as energy storage flywheels, the consumption of energy required to operate the rotor in the bearings is a significant factor. At high surface speeds, the fiction loss in ball bearings becomes large unlike magnetic bearings which generally have some rotating magnetic losses, resistance losses in the bearing coils, and amplifier/control circuit losses which result in lower rotating loss than ball bearings.

Moreover, electronic automatic control is used in magnetic bearings which support high speed rotors such as flywheel rotors. This automatic control, which needs to be present to operate magnetic bearings, can also be employed to assist in control of flywheel momentum or control moments. Further, the automatic control system can be employed to significantly reduce levels of vibration. Such automatic control, applied to such magnetic bearings is the subject of this invention.

Figure 3:
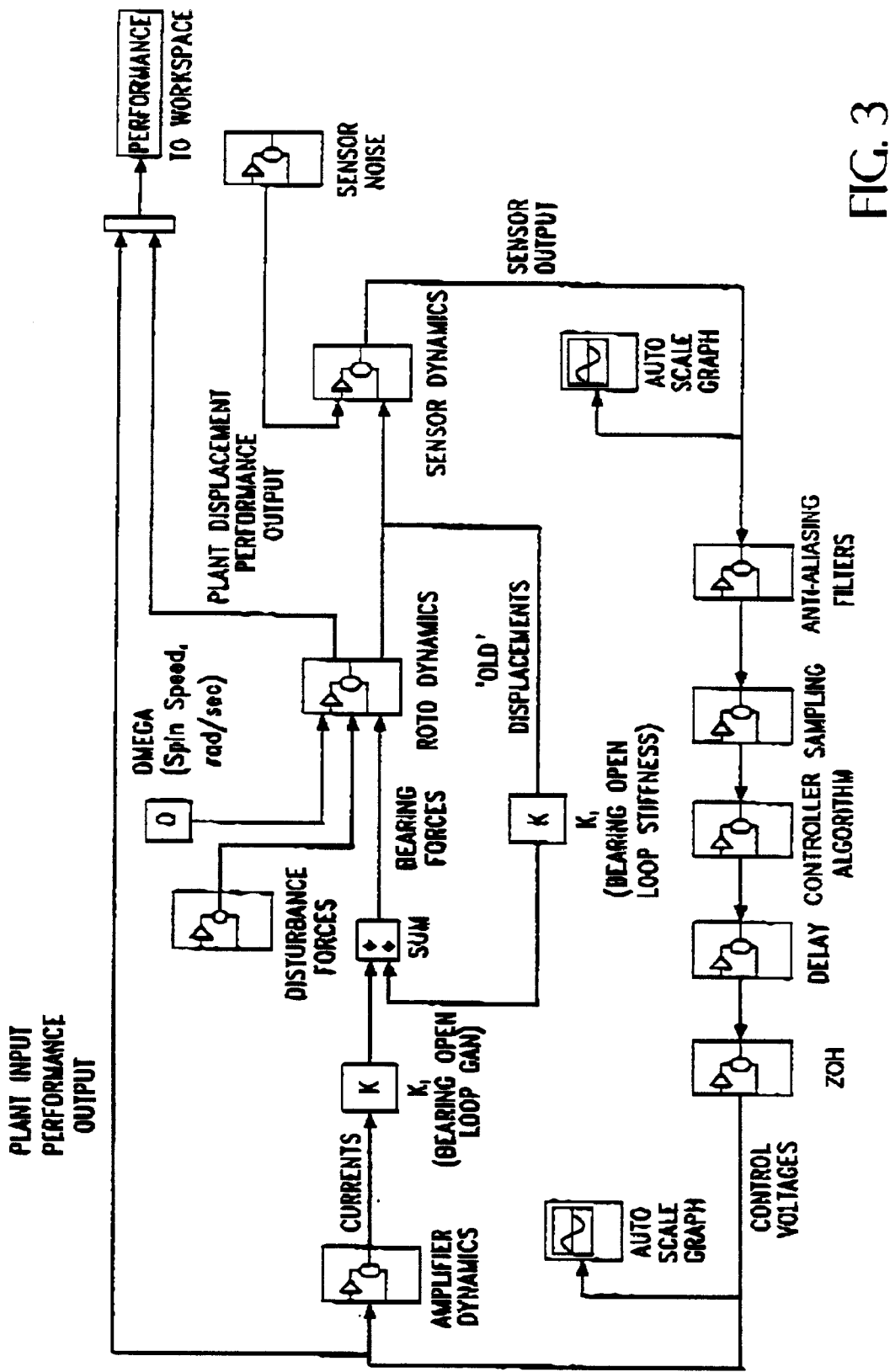
FIG. 3 depicts assembly of plant, bearings, sensors, amplifiers, and control system in an exemplary system.

A mathematical representation of a rotor-magnetic bearing system is initially constructed without the control system. It can be based upon a discretized numerical representation of the mechanical components of the rotor, struts, shaft, static support, vacuum housing, etc. The representation is formulated from physical dimensions such as diameters and lengths and material parameters such as the elastic modulus and Poisson's ratio. One typical numerical method is the finite element method. Other components in the system are magnetic and electronic. Equations modeling these components are also employed based upon physical dimensions such as magnetic bearing diameters, pole face areas, etc.; magnetic material properties such as permeability; electrical properties such as resistance, inductance, and capacitance; and electronic components such as amplifier voltages, currents, and efficiency. FIG. 3 shows a typical block diagram of components of the rotor-magnetic bearing system. The mathematical representation of the system is developed by standard engineering methods and is used to prepare the rotor-magnetic bearing system model called the plant. This model does not include the controller algorithm. The method of developing the controller is described in detail later in this application.

The particular variables employed in the mathematical representation may consist of physical parameters such as rotor or shaft displacements and/or velocities, magnetic bearing currents and/or voltages, etc. However, such a representation may consist of many variables and be of very large size, unsuited to controller development. Often, the large representation is reduced in size by employing the system modal properties, determined by standard eigenvalue methods. A method of selecting only the most important modes of the rotor-magnetic bearing system is used to remove less important system modes. However, the modal analysis insures that the system dynamic properties are still properly modeled and the controller can be properly designed. The modal mathematical representation has many less parameters to consider in the controller analysis.

The method of controller development starts with a mathematical model. A mathematical representation of the form $$\dot{x}=Ax+Bu$$

$$y=Cx+Du \quad (1)$$

as described below, or similar related forms, is employed in the development of the control theory applied to magnetic bearing supported rotors and is used in this invention. The above described mathematical representation, either in terms of physical parameters or modal parameters, can be placed in the form given by Eq. (1) or similar form. In this or similar form, there are a set of vectors and matrices with definitions as follows. The vector x is a list or column, of rotor displacements at selected locations along the rotor and other system properties such as bearing voltages or currents, known as the state vector. It is of order n meaning that there are n parameters in the state vector. The vector u is a list or column of control inputs, such as magnetic bearing currents or voltages, known as the control vector, with k parameters in that vector. The vector y is the list or column of outputs at particular locations in the system, such as displacements at the bearings or control currents at the bearings, where particular system performance is desired to be obtained.

The matrix A is the matrix representing the system plant, consisting of the rotor and associated magnetic bearing physical component characteristics, which is to be controlled. The matrix B is the matrix of system parameters relating the state vector x to the control input vector u. The matrix C is the matrix relating the output vector y to the state vector x. The matrix D is the matrix of system parameters relating the feedthrough of the control input vector u directly to the output vector y. The purpose of the mathematical representation is to obtain a set of equations which enables the system designer to calculate a control vector u which controls the rotor and magnetic bearing system in such a way that the output displacements, currents and other system parameters in the output vector y remain below design limitations.

In high speed rotors operating over a speed range, the rotor magnetic bearing control system matrices are functions of the rotor speed p. Thus, the mathematical representation may be written as $$\dot{x}=A(p)x+B(p)u$$

$$y=C(p)x+D(p)u \quad (2)$$

There are a number of controllers u which would allow the magnetic bearing system operate stabily but only one is the optimum solution. It is desired to find the controller which is the "maximal" solution, producing the minimum vibration level and/or control currents.

A method is described in this work where a single matrix X, which is positive definite, such that the linear matrix inequality $$\begin{bmatrix} A(p)^T X + XA(p) & XB(p) & C(p)^T \\ B(p)^T X & -\gamma I & D(p)^T \\ C(p) & D(p) & -\gamma I \end{bmatrix} < 0 \quad (3)$$

is satisfied for all values of the speed p in the specified speed range. In this equation, I is the identity matrix.

The performance parameter $\gamma$ in the above equation is the ratio of the input to output gain $$\frac{\|y\|_2}{\|u\|_2} < \gamma \quad (4)$$

where the quadratic norm of the output vector is given by $$\|y\|_2 = \int_0^\infty y^T y \, dt \quad (5)$$

and the quadratic norm of the input vector is given by $$\|u\|_2 = \int_0^\infty u^T u \, dt \quad (6)$$

The performance parameter $\gamma$ is the measure of the system output to the control input effort. It is desired to keep the measured system output parameters such as rotor displacement at critical points and magnetic bearing currents as low as possible for optimum operation of the rotor-magnetic bearing system. Thus, a method for determining the lowest possible value for the performance parameter $\gamma$ over the rotor-magnetic bearing system operating speed range is particularly valuable.

A system representation may be achieved at minimum and maximum operating speed. Let the minimum operating speed be denoted by $p_1=p_{min}$ and the maximum operating speed be denoted by $p_2=p_{max}$. These are called vertices or vertex speeds. A control vector u can be developed using standard, existing control methods, such as mu synthesis or $H_\infty$ can be found for the minimum and maximum speeds. There are mathematical models of these two systems. The minimum speed system is given by the mathematical representation $$\dot{x}=A_1(p_1)x+B_1(p_1)u$$

$$y=C_1(p_1)x+D_1(p_1)u \quad (7)$$

where the system properties $A_1, B_1, C_1, D_1$ are evaluated at the minimum operating speed. The system satisfies the linear matrix inequality $$\begin{bmatrix} A_1(p_1)^T X + XA_1(p_1) & XB_1(p_1) & C_1(p_1)^T \\ B_1(p_1)^T X & -\gamma_1 I & D_1(p_1)^T \\ C_1(p_1) & D_1(p_1) & -\gamma_1 I \end{bmatrix} < 0 \quad (8)$$

where the performance parameter is given by $$\frac{\|y\|_2}{\|u\|_2} < \gamma_1 \quad (9)$$

The maximum speed system is given by the mathematical representation $$\dot{x}=A_2(p_2)x+B_2(p_2)u$$

$$y=C_2(p_2)x+D_2(p_2)u \quad (10)$$

where the system properties A,B,C,D are evaluated at the maximum operating speed. The system satisfies the linear matrix inequality $$\begin{bmatrix} A_2(p_2)^T X + X A_2(p_2) & X B_2(p_2) & C_2(p_2)^T \\ B_2(p_2)^T X & -\gamma_2 I & D_2(p_2)^T \\ C_2(p_2) & D_2(p_2) & -\gamma_2 I \end{bmatrix} < 0 \quad (11)$$

where the performance parameter is given by $$\frac{\|y\|_2}{\|u\|_2} < \gamma_2 \quad (12)$$

for the maximum speed case. A linear parameter varying controller design can be achieved.

The control of the rotor-magnetic bearing system is given by the mathematical representation $$\dot{x}_K = A_K(p) x_K + B_K(p) y$$
$$u = C_K(p) x_K + D_K(p) y \quad (13)$$

The vector x is a list or column, of rotor displacements at selected locations along the rotor and other system properties such as bearing voltages or currents, known as the controller state vector, of order k The vector u is a list or column of control inputs, such as magnetic bearing currents or voltages, known as the control vector, as defined above. The vector y is the list or column of outputs at particular locations in the system, such as displacements at the bearings or control currents at the bearings, where particular system performance is desired to be obtained, again as defined above.

The matrices $A_K, B_K, C_K, D_K$ are the controller matrices. The values of the parameters obtained for these matrices are obtained by standard mu synthesis or $H_\infty$ methods such as given by standard engineering control methods. At the minimum operating speed, the matrices in the mathematical representation are denoted as $$\dot{x}_K = A_K(p_1) x_K + B_K(p_1) y$$
$$u_1 = C_K(p_1) x_K + D_K(p_1) y \quad (14)$$

At the maximum operating speed, the matrices in the mathematical representation are denoted as $$\dot{x}_K = A_K(p_2) x_K + B_K(p_2) y$$
$$u_2 = C_K(p_2) x_K + D_K(p_2) y \quad (15)$$

Once a mathematical representation of the control system $x_K, u_1, u_2$ has been obtained in these two forms, they can be substituted into the rotor-magnetic bearing system equation (x) and the closed loop system representation obtained. The closed loop control model has the general form $$\dot{x}_{cl} = A_{cl}(p) x_{cl} + B_{cl}(p) w$$
$$z = C_{cl}(p) x_{cl} + D_{cl}(p) w \quad (16)$$

Here the vectors w represent some system disturbances such as noise, external forces, or similar unwanted system inputs. The closed loop matrices are given by $$A_{cl} = A_0(p) + \hat{B}(p) \Omega(p) \hat{C}(p)$$

$$B_{cl} = B_0(p) + \hat{B}(p) \Omega(p) \hat{D}_{21}(p)$$

$$C_{cl} = C_0(p) + \hat{D}_{12}(p) \Omega(p) \hat{C}(p)$$

$$D_{cl} = D_{11}(p) + \hat{D}_{12}(p) \Omega(p) \hat{D}_{21}(p) \quad (17)$$

or similar mathematical form based upon the controller mathematical representations at the two vertex speeds. Here, the matrices on the right hand side of this expression are given by $$A_0(p) = \begin{bmatrix} A(p) & 0 \\ 0 & 0 \end{bmatrix}, \quad B_0(p) = \begin{bmatrix} B_1(p) \\ 0 \end{bmatrix} \quad (18)$$

$$C_0(p) = [\, C_1(p) \quad 0 \,], \quad \hat{B}(p) = \begin{bmatrix} 0 & B_2(p) \\ I & 0 \end{bmatrix}$$

$$\hat{C}(p) = \begin{bmatrix} 0 & I \\ C_2(p) & 0 \end{bmatrix}, \quad D_{12} = [\, 0 \quad D_{12}(p) \,]$$

$$\hat{D}_{12}(p) = \begin{bmatrix} 0 \\ D_{12}(p) \end{bmatrix}$$

The controller matrices $A_{cl}, B_{cl}, C_{cl}, D_{cl}$ are linear combinations of the minimum speed design matrices $A_1, B_1, C_1, D_1$ and the maximum speed design matrices $A_2, B_2, C_2, D_2$.

A positive definite matrix $X_{cl}$, of order (n+k)x(n+k) and a linear kth order linear parameter varying controller exists if the linear matrix inequalities $$\begin{bmatrix} A_{cl1}^T X_{cl} + X_{cl} A_{cl1} & X_{cl} B_{cl1} & C_{cl1}^T \\ B_{cl1}^T X & -\gamma_1 I & D_{cl1}^T \\ C_{cl1} & D_{cl1} & -\gamma_1 I \end{bmatrix} < 0 \quad (19)$$

where $A_{cl1}$ is the parameter dependent closed loop matrix evaluated at the minimum speed and $$\begin{bmatrix} A_{c2}^T X_{cl} + X_{cl} A_{cl2} & X_{cl} B_{cl2} & C_{cl2}^T \\ B_{cl2}^T X & -\gamma_2 I & D_{cl2}^T \\ C_{cl2} & D_{cl2} & -\gamma_2 I \end{bmatrix} < 0 \quad (20)$$

where $A_{cl2}$ is the parameter dependent closed loop matrix evaluated at the maximum speed are satisfied.

The solution to this problem exists if and only if there are two symmetric matrices R and S of size nxn satisfying the five linear matrix inequalities:

$$\begin{bmatrix} N_R & 0 \\ 0 & I \end{bmatrix}^T \begin{bmatrix} A_i R + R A_i^T & R C_i^T & B_{1i} \\ C_{li} R & -\gamma I & D_{11i} \\ B_{li} & D_{11i} & -\gamma I \end{bmatrix} \begin{bmatrix} N_R & 0 \\ 0 & I \end{bmatrix} < 0 \quad (21)$$

where i=1,2 and $$\begin{bmatrix} N_S & 0 \\ 0 & I \end{bmatrix}^T \begin{bmatrix} A_i^T S + SA_i & SB_{1i} & C_{1i}^T \\ B_{1i}^T S & -\gamma I & D_{11i}^T \\ C_{1i} & D_{11i} & -\gamma I \end{bmatrix} \begin{bmatrix} N_S & 0 \\ 0 & I \end{bmatrix} < 0 \quad (22)$$

where i=1,2 and $$\begin{bmatrix} R & I \\ I & S \end{bmatrix} \geq 0 \quad (23)$$

Also, a kth order controller exists if and only if $$\text{rank}(I-RS) \leq k \quad (24)$$

Given acceptable matrices R and S, it is possible to construct the closed loop matrix $X_{cl}$ and corresponding controller matrices $A_1, B_1, C_1, D_1$ and $A_2, B_2, C_2, D_2$.

This section describes the methodology used to compute the controller matrices. Full rank matrices M and N of size nxk are found from $$MN^T = I - RS \quad (25)$$

The closed loop control matrix $X_{cl}$ is obtained from the unique solution of $$\begin{bmatrix} I & R \\ 0 & M^T \end{bmatrix} = X_{cl} \begin{bmatrix} S & I \\ N^T & 0 \end{bmatrix} \quad (26)$$

The two vertex controllers are obtained from the above linear matrix inequalities, Eqs. (19) and (20). The controller matrices are given by $$A(p) = \alpha_1 A_1 + \alpha_2 A_2$$
$$B(p) = \alpha_1 B_1 + \alpha_2 B_2$$
$$C(p) = \alpha_1 C_1 + \alpha_2 C_2$$
$$D(p) = \alpha_1 D_1 + \alpha_2 D_2 \quad (27)$$

where the dimensionless speed parameters $\alpha_1$ and $\alpha_2$ are given by $$\alpha_1 = \frac{p_{max} - p}{p_{max} - p_{min}} \quad (28)$$

$$\alpha_2 = \frac{p - p_{min}}{p_{max} - p_{min}}$$

SIMULATION EXAMPLE

Figure 4:
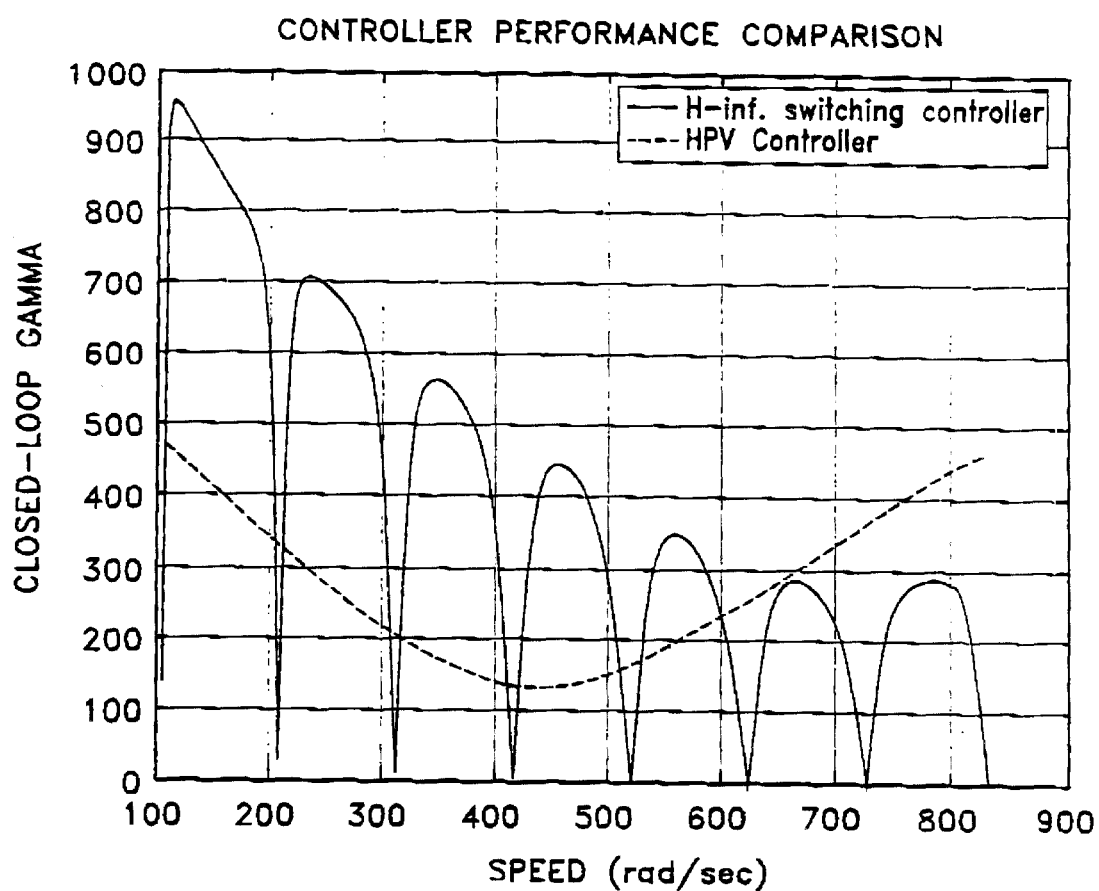
FIG. 4 shows an exemplary performance comparison between eight interpolated $H_\infty$ controllers and a single lpv controller for a flexible rotor.

A magnetic bearing controller for a flexible rotor supported in magnetic bearings was evaluated using the linear parameter varying methodology of the invention. The results, expressed in terms of the performance parameter $\gamma$, are given in FIG. 4. The rotor speed range is 104 rad/sec to 832 rad/sec. The speed range is relatively large and the gyroscopic changes in the plant are quite significant as the operating speed changes. A comparison between eight $H_\infty$ controllers and one linear parameter varying controller (LPV) is shown in FIG. 4. The eight $H_\infty$ controllers were designed at the specific operating speeds of 104, 208, 312, 416, 520, 624, 726, and 832 rad/sec. It is easily seen in FIG. 4 that these controllers produce a very low value of the performance parameter at each design operating speed. A set of interpolating controllers was developed to allow these controllers to operate between the design speeds with the results given in FIG. 4. The performance parameter $\gamma$ has very low values exactly at the design points but relatively high peaks in between those values. These high peaks may be thought of as high vibration levels or high magnetic bearing controller currents.

An example LPV controller was also designed for this flexible rotor using the invention. The method employed $H_\infty$ controllers evaluated at the minimum and maximum speeds (vertices), 104 rad/sec and 832 rad/sec. The LPV method was then used to evaluate a single controller which operates over the complete speed range. The results are also plotted in FIG. 4. It is easily seen that the LPV controller has a smooth variation of the performance parameter $\gamma$ over the entire speed range from 104 to 832 rad/sec. Again, these smoothly varying values of the performance parameter represent low to moderate levels of vibration and/or magnetic bearing coil currents over the entire operating range.

It is important to note that the LPV controller is a single controller with better performance overall than eight interpolated single speed design $H_\infty$ controllers. Thus, the size of the LPV controller is approximately eight times smaller, allowing for a much smaller computer capacity requirement, than the example eight $H_\infty$ controllers. If the computer hardware requirements and storage capacity were relatively unlimited, a very large number of nearly optimum $H_\infty$ or other optimized controllers can be developed for many specific speeds in the operating range and the system performance could be very good. However, there are practical limitations of cost, weight, size and other factors which normally limit the controller degree of complexity and make the LPV controller very desirable for high speed rotors operating over speed range as compared to the standard control design methods for a time independent plant.

What is claimed is:

1. A rotor system comprising rotor, magnetic bearings, and a linear parameter varying controller for the magnetic bearings wherein said controller is responsive to linear matrix inequalities.

2. A rotor system comprising rotor, magnetic bearings, and a linear parameter varying controller for the magnetic bearings wherein bias current is less than one-half saturation level in the magnetic bearings.

3. A controller for a magnetic bearing system for a rotor system, said controller being a linear parameter varying controller responsive to linear matrix inequalities.

4. A controller for a magnetic bearing system for a rotor system, said controller being a linear parameter varying controller wherein bias current is less than one-half saturation level in the magnetic bearings.

* * * * *